Jan. 30, 1934.   A. HEWITT   1,944,981
METAL PLANING AND LIKE MACHINE TOOL
Filed Feb. 10, 1932   5 Sheets-Sheet 1

*Inventor*
*A. Hewitt:*
*by*
*W. E. Evans*
*Attorney.*

Jan. 30, 1934. A. HEWITT 1,944,981
METAL PLANING AND LIKE MACHINE TOOL
Filed Feb. 10, 1932 5 Sheets-Sheet 2

Inventor
A. Hewitt:
by
W. E. Evans
Attorney.

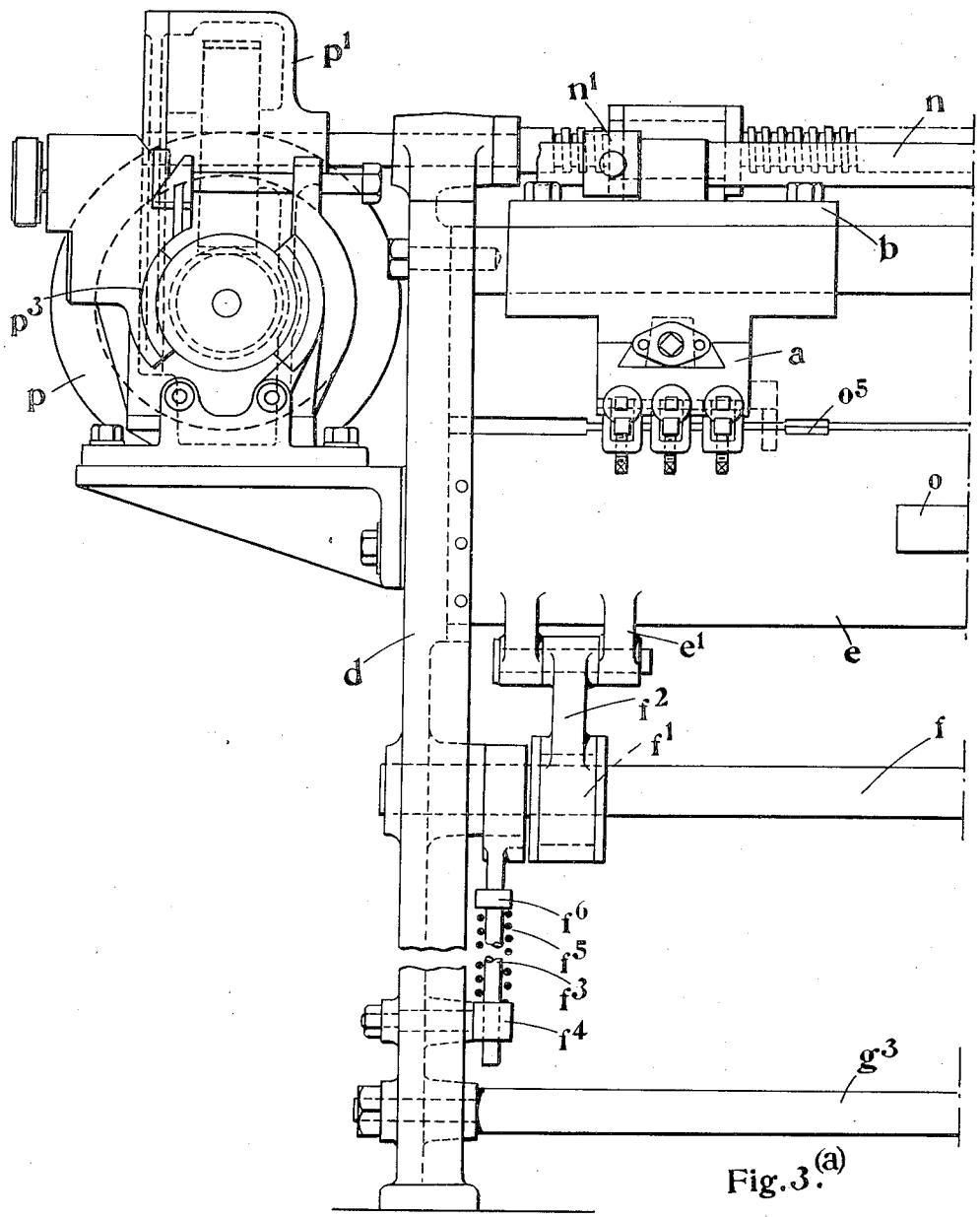

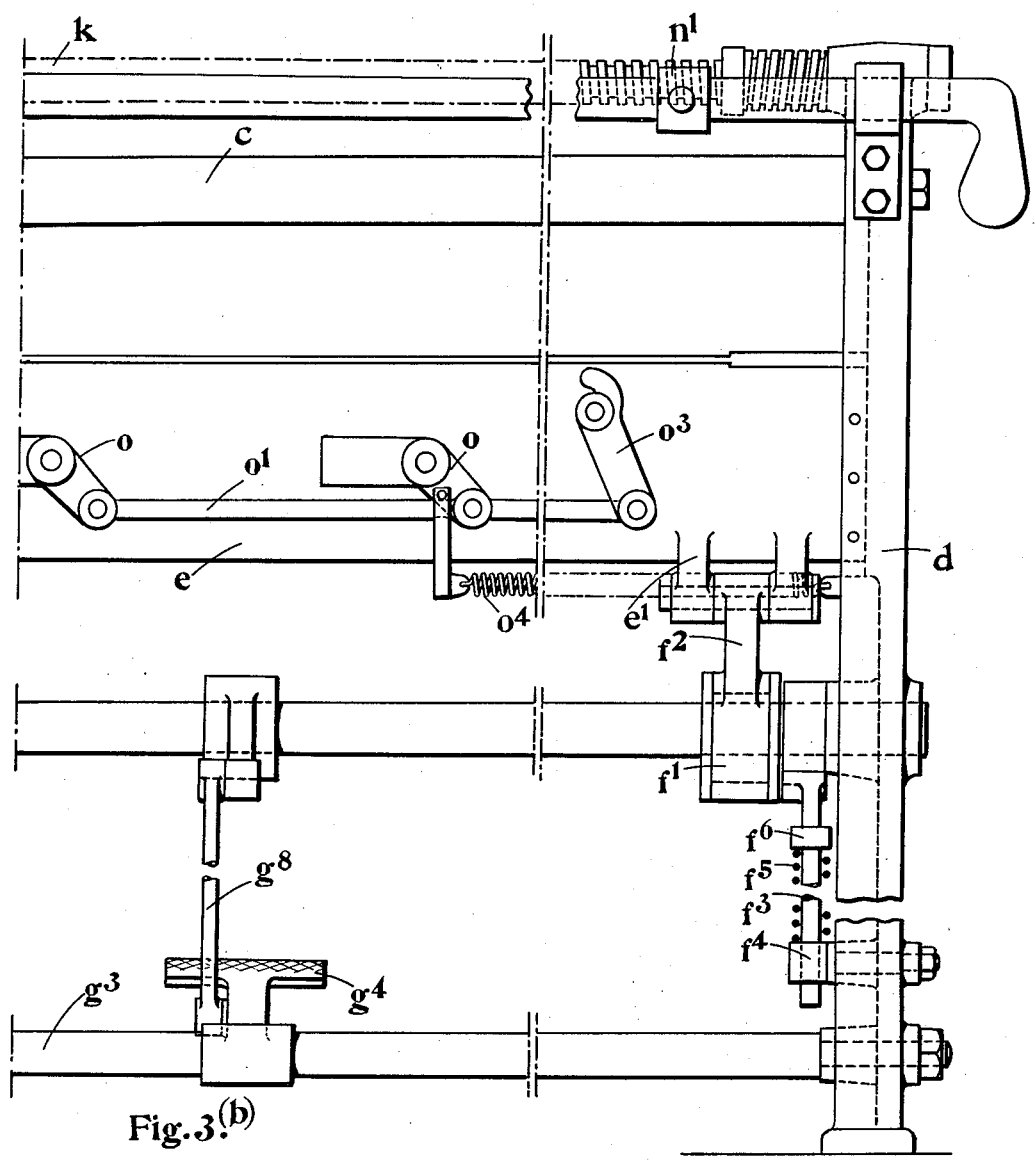

Patented Jan. 30, 1934

1,944,981

UNITED STATES PATENT OFFICE 1,944,981

METAL PLANING AND LIKE MACHINE TOOL

Albert Hewitt, London, England

Application February 10, 1932, Serial No. 592,012, and in Great Britain February 28, 1931

7 Claims. (Cl. 90—42)

This invention relates to the planing or finishing of bars or strips of metal or the like such as printers' rules for printers' forms.

The invention has among its objects to plane or to finish with accuracy, convenience and expedition and in a simultaneous operation the opposite edges or faces of single straight line rules, multiple straight line rules, or rules of ornamental design or of various type.

According to the invention the opposite edges or faces of a metal bar or the top and bottom faces of a metal strip are simultaneously planed or finished in one operation whereby the strip may be thus produced to a determined or type height.

According to the invention, moreover, a sliding head is adapted to move back and forth by mechanical means to an extent corresponding to the length of the bar or strip to be planed or finished, and the sliding head is adapted in transversely opposite positions and at each side of the bar or strip for the reception of the cutting tools, whereby on the movement of the sliding head the cutting tools are moved forward with respect to the bar or strip, which is fixedly held in position between them so that thus the exposed opposite edges or faces of the bar or strip are simultaneously planed or finished on the movement of the sliding head.

According to the invention, moreover, the metal bar or strip is adapted to be clamped in a vise, so that its opposite edges or faces or its top and bottom faces are exposed at opposite sides in the line of movement of the respective cutting tools, the means employed being conveniently adapted for the ready release of the bar or strip and for ready introduction of the bar or strip into its position for the planing or finishing operation. For this purpose according to the invention the support for the sliding head by which the cutting tools are carried has a face provided of a width corresponding to or slightly less than the width of the bar or strip to be planed or finished, while a movable member is provided in alignment with the support for the sliding head, and this movable member is adapted to be guided so that it may be brought into position to clamp the bar or strip against the support, and means are provided by which the movable member referred to may normally be caused to engage the bar or strip.

According to the invention, moreover, means are provided for adjusting the tools, such means comprising horizontal and vertical slides having independent adjustments for the tools and separate adjustments for the main tool slides. Any number of tools or sets of tools may be provided in opposite positions. Thus, for example, three tools may be provided in opposite positions at each side, that are adapted to be set with precision whereby three or other number of distinct cuts may be simultaneously made in planing or finishing the opposite faces of the bar or strip to the exact width or dimension required.

According to the invention, moreover, the tool holder is provided detachable whereby the tools may be mounted away from the machine and may be adjusted and then located in position on the slides by means of suitable locating pins or other convenient means.

According to the invention, moreover, means may be provided for determining or varying according to requirements the stroke of the sliding head by which the tools are carried.

The construction of the tool may be such that the movable member is disposed either in the lower or upper position with respect to the support, and the means by which the movable member is caused to approach the support to grip the bar or strip may consist of a spindle parallel with the movable member, eccentrics fixedly mounted upon the spindle, arms acting as eccentric straps conveniently connected as links to the movable member, and another arm or arms fixedly mounted on the spindle to which bolts are connected which are mounted under the action of helical compression springs, together with a foot lever linked to an arm or one of the arms fixed to the spindle so that upon the depression of the foot lever the movable member is caused to move away from the support against the action of the helical springs when it is desired to release or to introduce a bar or strip of metal into the vise constituted by the support for the sliding head and the movable member.

The invention also comprises the features which are hereinafter described.

The invention is illustrated by way of example in the accompanying diagrammatic drawings:

Figure 3 is a rear elevation of a modified construction of the machine tool.

Figure 2:
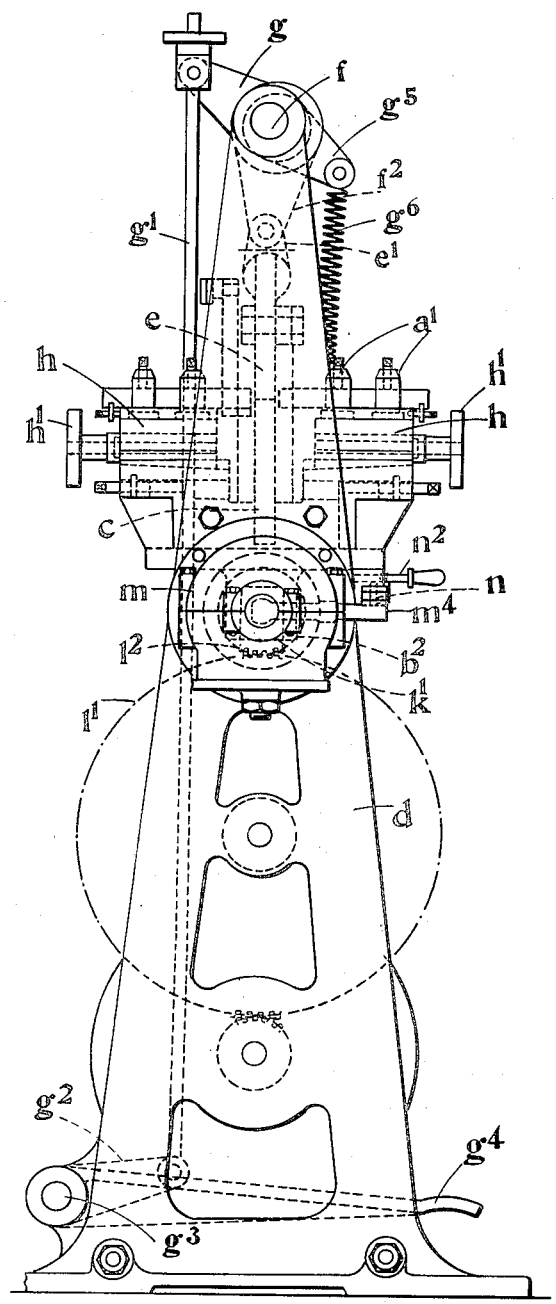
Figure 2 is an end elevation of the machine tool shown in Figure 1 as viewed from the right hand end of that figure.
Figure 1:
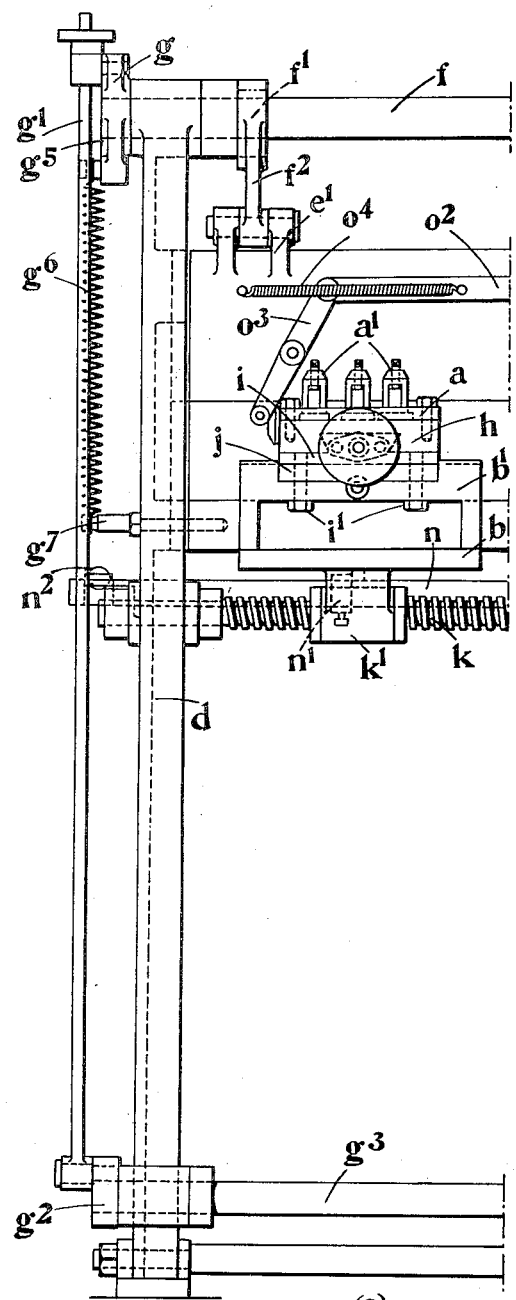
Figure 1 is a rear elevation of one construction of machine tool according to the invention.
Figure 1:
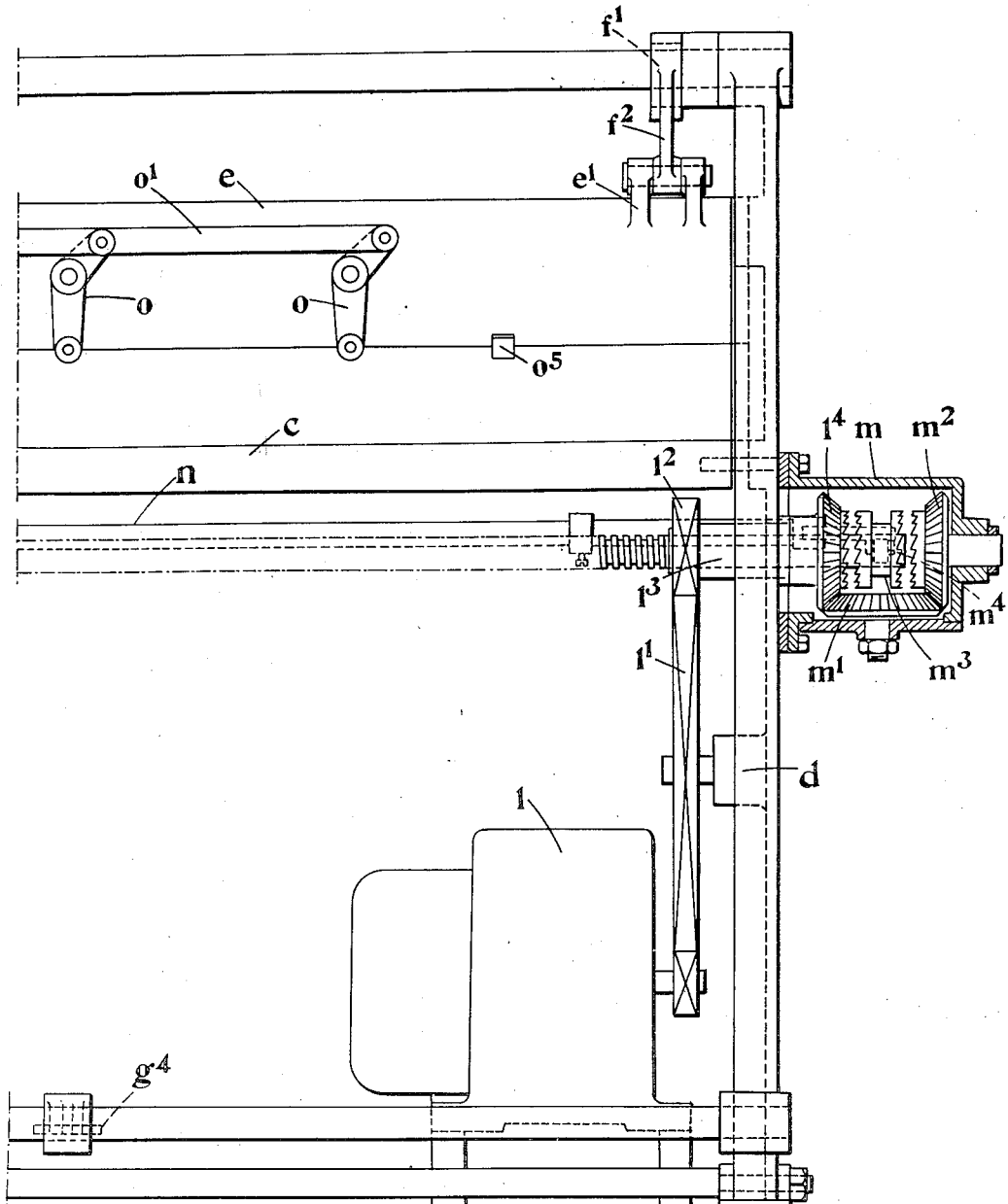

In carrying the invention into effect according to one construction of machine intended for planing or finishing the top and bottom faces of strip metal or printers' rule to exact width or type height, as represented in Figures 1 and 2, a tool carrier $a$ is mounted upon a sliding head $b$ that is adapted to be supported and reciprocated upon a horizontally disposed support or beam $c$ extending the length of the machine, which is conveniently carried at the ends upon lateral frame parts $d$ of a height convenient to the use of the machine. The horizontally disposed support or beam $c$ is conveniently provided of a T-shaped transverse cross-section which is inverted with its transverse parts extending out at each side of the upwardly extending middle limb or web so that the sliding head $b$ may be accommodated upon the outer sides of the transverse part and below the said part for the support of a tool holder $a$ at each side of the upwardly extending limb or web. The upper face of the latter is provided of a width corresponding to or slightly less than that of the bar or strip to be operated upon, and constitutes the fixed jaw of the vise by which the work is held. The movable member $e$ forming the second jaw of the vise is adapted to be mounted above the support or beam $c$ and in alignment with the middle limb or web thereof and is of a length co-extensive with the beam or support $c$, the lower face of the movable member being similarly provided of a width corresponding to or slightly less than that of the bar or strip to be operated upon so that this may be held in position to permit the exposed surfaces to be planed or finished. The movable member $e$ also engages at its ends within vertical grooves conveniently provided in the lateral frame parts $d$ and towards each end, and if desired in intermediate positions, it is connected by means of lugs or arms $e^1$ to arms $f^2$ of eccentrically mounted fittings $f^1$ that are carried upon a spindle $f$ disposed parallel with and above the movable member and supported in bearings within the lateral frame parts $d$. An arm $g$ carried upon the spindle $f$ may be connected by means of a rod or link $g^1$ to an arm $g^2$ mounted upon a spindle $g^3$ also supported in the frame parts $d$ and having fixedly mounted thereon a pedal $g^4$. The spindle $f$ further carries an arm $g^5$ which may be a continuation of the arm $g$ to which is connected a helical spring $g^6$ anchored to a stud $g^7$ mounted in the adjacent lateral frame part $d$. By such means on the depression of the pedal lever $g^4$ the spindle $f$ is partially rotated, whereby owing to the presence of the eccentrics $f^1$ fixed upon the spindle, the movable member $e$ is caused to move upwardly away from the support $c$ to release a bar or strip or permit its introduction. By reason of the provision of the helical spring the movable member is normally maintained in its position to clamp the bar or strip against the support or beam.

The sliding head $b$ is provided to support two tool holders $a$ one in front of the support beam $c$ and the other at the back. Each of the tool holders is carried upon a transverse slide $h$ which is adjusted in position by means of a suitable feed spindle and nut operated by a graduated head $h^1$. The transverse slides $h$ are themselves adapted for adjustment of the tool slide in the vertical direction, and for this purpose each slide $h$ is mounted upon a dove-tail slide rib formed upon a plate $i$, the lower surface of which inclines downwardly towards the middle limb or web of the support or beam $c$ so that the plate is of increasing thickness. The said plate is supported upon a wedge member $j$ which is seated in a recess in the upper surface of a box-like fitting $b^1$ to which the plate $j$ is connected by means of vertically disposed pins or bolts $i^1$ passing with clearance through the upper portion of the box-like fitting $b^1$ and through corresponding slots in the wedge member $j$. The latter is adapted to be adjusted in position towards and away from the middle limb of the beam or support $c$ by means of a feed spindle and nut so that as it is advanced it serves to raise the plate $j$ and with the latter the transverse slide $h$ and the tool carrier $a$.

Each tool holder $a$ is adapted to carry a number of tool boxes $a^1$, for example, six tool boxes for three tools, the said tools being adjusted in such manner as to give in succession a first cut, an intermediate cut and a finishing cut. The tool boxes are conveniently of cylindrical form provided with a collar at the lower end and are adapted to be received into corresponding seatings or holes provided in the tool carrier $a$. The latter is secured to the transverse slide $h$ by such means as bolts or positioning pins in such manner that it may be readily removed, together with the tool boxes for the adjusting and fixing of the tools into the adjusted positions on a suitable jig. The tools may also be adapted to be adjusted in the tool boxes by means of adjusting screws with collars which engage slots or channels formed in the shank of the tools. Thus, the tools when in position in the tool boxes may be adjusted as required and clamped in the adjusted position by the usual clamping screw. It will thus be understood that the tools are so carried that when they are set in the machine they can be adjusted to the required height and so that any wear may be accommodated by adjustment. While three tools are shown as carried upon each tool holder, any convenient number of tools may be provided, and each tool may be fitted with separate screw adjustment so that the cut may be graduated and distributed between the tools provided to any extent desired.

Again, other means may be provided than those described for effecting a vertical as well as a horizontal adjustment of the tools.

The sliding head $b$ is reciprocated by means of a lead screw $k$ located in a suitable position in relation to the head and carried in suitable bearings in the lateral frame parts $d$. The lower face of the head is formed with a nut box provided as two downwardly depending lugs $b^2$ between which is confined a rectangular nut $k^1$ screw-threaded to fit the screwed spindle $k$. The screwed spindle $k$ is rotated from an electromotor $l$ through a reducing gear and reversing bevel pinion drive provided with a clutch. The reducing gear $l^1$ serves to drive a pinion $l^2$ carried upon a sleeve $l^3$ rotatably fitted upon the spindle $k$ and extending through the adjacent lateral frame part $d$ into a reversing gear casing $m$ within which the sleeve carries a bevel pinion $l^4$. The casing $m$ serves to carry the stub spindle for an intermediate bevel pinion $m^1$ and also the reversing pinion $m^2$. The pinions $l^4$ and $m^2$ are provided with clutch teeth and a floating clutch member $m^3$ provided with a bore of square section is mounted to slide upon the squared extremity of the screwed spindle $k$ which extends into the casing $m$. A clutch lever $m^4$ fitted upon a vertical pivot is provided to extend into the gear casing and to engage with its inner end an annular channel or groove provided in the clutch fitting $m^3$.

In a position parallel to the spindle $k$ in bearings formed in the lateral frame parts $d$ there is mounted a slidable striker bar $n$ on which are fitted adjustable stops $n^1$ adapted to contact with a projection or stud carried by the sliding head $b$. Thus, the stops $n^1$ having been adjusted according to the travel to be given to the sliding bar $b$ when the latter reaches the end of its travel it engages the stop $n^1$ and moves the striker bar $n$ longitudinally. The striker bar is provided with suitable projections which engage a stud or the like on the clutch lever $m^4$ whereby the clutch lever is thrown over to carry the clutch from engagement with the one pinion $l^4$ into engagement with the other pinion $m^2$, thus reversing the direction of rotation of the screwed spindle $k$ for the return movement of the sliding head.

Any suitable means may be provided to carry the tools out of contact with the work on the return movement, as, for example, cams, pawls or the like which are set to withdraw the transverse slides carrying the tool holders during such return movement.

In order to permit of hand operation of the striking bar there is conveniently provided at the end other than that occupied by the reversing gear a hand lever $n^2$ pivoted upon a suitable bracket supported from the lateral frame part $d$ and engaging by means of a slot a pin carried upon a block fitted laterally upon the striker bar.

Means are provided to locate the bar or strip in the position in which it is to be clamped, such means comprising members $o$ in the form of angle levers which are pivotally mounted upon the movable member $e$ in such manner that their lower ends may extend into the line of contact of the movable member and the support or beam $c$. The upper ends of the said levers are connected by a link $o^1$ and a similar link $o^2$ couples the said levers with a lever $o^3$ also pivoted upon the movable member and having the lower end adapted to extend into the path of one of the tool carriers $a$ in such manner that when the tool holder is in the initial position the levers $o$ are moved to bring their lower ends into the said line of contact, such movement being effected against the action of a spring $o^4$. Thus, when the movable member is separated from the support or beam $c$, the lower ends of the levers $o$ form locating stops to determine the position of the strip or bar between the movable member and the beam or support. When the tool holder moves forward the spring $o^4$ serves to move the levers $o$ out of the path of the tools.

A stop $o^5$ may also be provided to be seated in recesses formed respectively in the movable member and the beam or support $c$ to determine the position of the end of the bar or strip far removed from the tool holder when the latter is in its initial position.

Figures 4, 5:
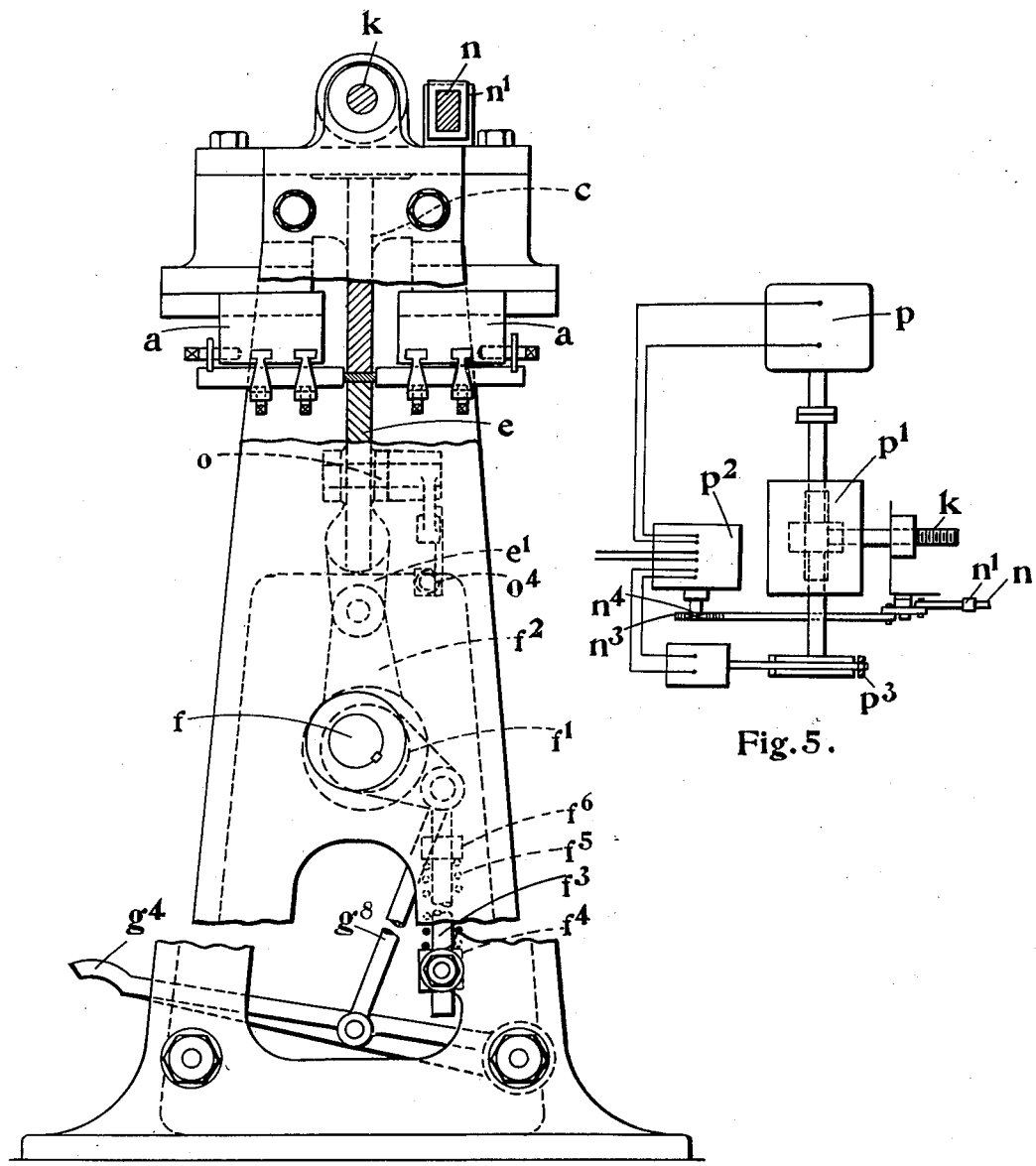
Figure 4 is an end elevation corresponding to Figure 3 viewed from the left hand end of Figure 3 and being partly in section.
Figure 5 is a detail diagram of electrical connections in relation to the constructions shown in Figures 3 and 4.

According to an alternative construction, as represented in Figures 3 and 4, the positions of the beam or support and the movable member, together with the sliding head, are reversed so that the movable member is adapted to be moved upwardly to engage the bar or strip against the beam or support. The spindle $f$ is disposed below the movable member and the arms $f^2$ are connected to rods $f^3$ which are mounted to slide in bearings $f^4$ carried by the lateral frame parts $d$. Helical springs $f^5$ coiled about the rods $f^3$ are confined above the bearings $f^4$ by means of collars $f^6$.

The pedal $g^4$ is again carried by the spindle $g^3$ and is linked to an arm upon the spindle $f$ by a link $g^8$.

The screw-threaded spindle $k$ is disposed above the support $c$ and is engaged with the sliding head in the manner hereinbefore described. It is operated directly by an electro-motor $p$ (Figure 5) and worm reducing gear $p^1$, the said motor being controlled by a two-way or reversing switch $p^2$ and a magnetic brake $p^3$ under the action of the striker bar $n$, the longitudinal movement of which is transmitted to the switch by means of a rack member $n^3$ linked to the striker bar and engaging a pinion $n^4$ on the spindle of the switch, so that on the sliding head $b$ travelling to its limit as determined by the stop or dog $n^1$, the switch is thrown in the "off position" and the magnetic brake applied, the motor thus being stopped, whereby the rotation of the screw-threaded spindle is arrested. A further movement of the striker bar in the same direction may then serve to throw in the reversing switch by which the operation of the machine is reversed until the opposed limit stop or dog $n^1$ is reached when the machine may automatically stop in a similar manner at the opposite end.

Alternatively the brake mechanism may be cut out and the machine worked continuously back and forth by means of the switch gear. When the machine is thus arranged the tool slides may be controlled by suitable cams so that both the front and back tools may be thrown out of engagement with the metal bar or strip to be planed, on the return strokes, and brought back into the planing position on the forward stroke.

In the construction represented in Figures 3 and 4 also the means for locating the bar or strip are again carried by the movable member and comprise levers $o$ which are coupled to a lever $o^3$ having a projection or finger piece adapted to engage a corresponding projection upon the tool carrier $a$. The movement of the levers by the tool carrier is effected against the action of a spring which is anchored between the adjacent lateral frame member and a stud or pin carried by the link connecting the levers $o$.

A timing device may be provided to permit the machine making one, two or three complete cycles or strokes as may be required according to particular practical requirements. Thus, in the machine represented in Figures 1 and 2, the clutch lever may be operated through suitable lever and link mechanism from a cam or cams rotated from the motor and provided to give the required cycle of operation, such cam or cams being adjustable if desired, and intermediate change gear being provided if required to vary the travel of the sliding head with respect to the control imposed by the cam or cams.

The invention is not limited to the particular means for causing the automatic operation of the machine, nor to the means specifically described for clamping the bar or strip in position, nor to the means for mounting the tools, as these and other constructional details may be modified without departing from the invention. Thus, for example, means may be provided whereby when the sliding head is caused to make more than one stroke the tools may be fed forward for the succeeding strokes. Thus, the transverse slides may be adjusted by the provision of pawls or other suitable means adapted to co-operate with the control head of the feed screw, such pawls or the like being operated at the end of each stroke of the sliding head.

I claim:—

1. Metal planing and like machine tools adapted simultaneously to plane and finish in one operation the opposite edges of a metal bar, comprising two frame parts, a support for the bar extending between and carried by the said frame parts, a tool slide embracing said support and carried thereby, tool carriers disposed upon said tool slide respectively on the two sides of the support, cutting tools mounted in said tool carriers, a clamping member for holding the bar upon the support movable towards and away from said support on said frame parts, and means for reciprocating the tool slide upon the said support.

2. Metal planing and like machine tools adapted simultaneously to plane and finish in one operation the opposite edges of a metal bar, comprising two frame parts, a support for the bar extending between and carried by the said frame parts, said support being of a T-shaped cross-section set to support the metal bar on the middle limb, a tool slide embracing the transverse limbs of the support and carried thereby, tool carriers disposed upon said tool slide respectively on the two sides of the support, cutting tools mounted in said tool carriers, a clamping member for holding the bar upon the support movable towards and away from said support on said frame parts, and means for reciprocating the tool slide upon the said support.

3. Metal planing and like machine tools adapted simultaneously to plane and finish in one operation the opposite edges of a metal bar, comprising two frame parts, a support for the bar extending between and carried by the said frame parts, a tool slide embracing said support and carried thereby, tool carriers disposed upon said tool slide respectively on the two sides of the support, a plurality of tool holders provided upon each of said tool carriers, a cutting tool carried by each of said tool holders, means upon each of said tool carriers for the independent feed of the respective cutting tools, means, applied to said tool carriers for effecting a feed movement thereof, a clamping member for holding the bar upon the support movable towards and away from said support on said frame parts, and means for reciprocating the tool slide upon the said support.

4. Metal planing and like machine tools adapted simultaneously to plane and finish in one operation the opposite edges of a metal bar, comprising a support for the bar, lateral frame parts in which said support is mounted, a tool slide embracing said support and carried thereby, tool carriers disposed upon said tool slide respectively on the two sides of the support, cutting tools carried upon said tool carriers, a clamping member for holding the bar upon the support adjustable towards and away from said support in said lateral frame parts, an oscillatory spindle mounted in said lateral frame parts parallel with said clamping member, eccentrically mounted fittings carried by said spindle and provided with arms pivoted to said clamping member, means for oscillating said spindle to impart movement to said clamping member, and means for reciprocating the tool slide upon the said support.

5. Metal planing and like machine tools adapted simultaneously to plane and finish in one operation the opposite edges of a metal bar, comprising a support for the bar, lateral frame parts in which said support is mounted, a tool slide embracing said support and carried thereby, tool carriers disposed upon said tool slide respectively on the two sides of the support, cutting tools carried upon said tool carriers, a clamping member for holding the bar upon the support adjustable towards and away from said support in said lateral frame parts, an oscillatory spindle mounted in said lateral frame parts parallel with said clamping member, eccentrically mounted fittings carried by said spindle and provided with arms pivoted to said clamping member, an arm upon said spindle, a pedal supported from said frame members, a link to transmit movement from said pedal to the arm upon the spindle to impart movement to the clamping member, and means for reciprocating the tool slide upon the said support.

6. Metal planing and like machine tools adapted simultaneously to plane and finish in one operation the opposite edges of a metal bar, comprising two frame parts, a support for the bar extending between and carried by the said frame parts, a tool slide embracing said support and carried thereby, tool carriers disposed upon said tool slide respectively on the two sides of the support, cutting tools mounted in said tool carriers, a clamping member for holding the bar upon the support movable towards and away from said support on said frame parts, means for reciprocating the tool slide upon the said support comprising a lead screw parallel with said support, means upon said tool slide to engage said lead screw, and means for rotating said lead screw at will in opposite directions.

7. Metal planing and like machine tools adapted simultaneously to plane and finish in one operation the opposite edges of a metal bar, comprising a support for the bar, a tool slide embracing said support and carried thereby, said tool slide being adapted for reciprocation upon said support, tool carriers disposed upon said tool slide respectively on the two sides of the support, cutting tools mounted in said tool carriers, stops for determining the position of the metal bar upon the said support, said stops being pivoted upon said support, a control lever for said stops, said control lever being operated from said tool slide at the ends of its travel to throw said stops into the operative position, a clamping member for holding the bar upon the support, and means for reciprocating the tool slide upon the said support.

ALBERT HEWITT.